(12) United States Patent
Pandey et al.

(10) Patent No.: US 11,183,140 B2
(45) Date of Patent: Nov. 23, 2021

(54) HUMAN RELATIONSHIP-AWARE AUGMENTED DISPLAY

(71) Applicant: INTERNATIONAL BUSINESS MACHINES CORPORATION, Armonk, NY (US)

(72) Inventors: Diwesh Pandey, Bangalore (IN); Arun Joseph, Bangalore (IN); Anand Haridass, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 253 days.

(21) Appl. No.: 16/156,207

(22) Filed: Oct. 10, 2018

(65) Prior Publication Data
US 2020/0118515 A1 Apr. 16, 2020

(51) Int. Cl.
*G06F 16/00* (2019.01)
*G09G 5/00* (2006.01)
*G06K 9/00* (2006.01)
*G06F 3/14* (2006.01)
*G10L 17/00* (2013.01)

(52) U.S. Cl.
CPC ........... *G09G 5/003* (2013.01); *G06F 3/1423* (2013.01); *G06K 9/00362* (2013.01); *G10L 17/00* (2013.01); *G09G 2354/00* (2013.01)

(58) Field of Classification Search
None
See application file for complete search history.

(56) References Cited

U.S. PATENT DOCUMENTS

| 7,424,488 B2 | 9/2008 | Aggarwal et al. |
| 8,521,787 B2 | 8/2013 | Bosworth et al. |
| 8,965,828 B2 | 2/2015 | Greenzeiger et al. |

(Continued)

FOREIGN PATENT DOCUMENTS

| WO | 2006102261 A2 | 9/2006 |
| WO | 2016125042 A1 | 8/2016 |

OTHER PUBLICATIONS

Active Personal Information Manager: A System for Human Memory Support, Migliardi et al., (Year: 2011).*

(Continued)

*Primary Examiner* — Jean M Corrielus
(74) *Attorney, Agent, or Firm* — Kenneth Han (57) ABSTRACT

A method, computer system, and computer program product for human relationship-aware augmented display are provided. The embodiment may include identifying one or more potential viewers utilizing real-time sensor data. The embodiment may also include extracting relationship information related to relationships among each identified viewer and one or more companions based on a plurality of data from a plurality of databases. The embodiment may further include creating a relationship graph based on the extracted relationship information. The embodiment may also include determining a relationship model based on the created relationship graph. The embodiment may further include mapping the determined relationship model to content. The embodiment may also include augmenting display systems with the content. The embodiment may further include displaying the augmented content on one or more display systems.

20 Claims, 8 Drawing Sheets

(56) References Cited

U.S. PATENT DOCUMENTS

| | | | |
|---|---|---|---|
| 9,105,126 | B2 | 8/2015 | Fein et al. |
| 9,111,296 | B2 | 8/2015 | Gorpynich et al. |
| 9,286,323 | B2 | 3/2016 | Cardonha et al. |
| 9,589,043 | B2 | 3/2017 | Onusko |
| 9,891,884 | B1* | 2/2018 | Baughman ......... G06K 9/00302 |
| 10,031,566 | B2* | 7/2018 | Rogo ..................... G07C 5/008 |
| 10,055,752 | B2* | 8/2018 | Boldyrev ........... G06Q 30/0255 |
| 10,110,942 | B2* | 10/2018 | Lyons .............. H04N 21/47205 |
| 10,362,360 | B2* | 7/2019 | Gossweiler ........ H04N 21/6587 |
| 10,958,958 | B2* | 3/2021 | Hardee ............ H04N 21/23418 |
| 2005/0046584 | A1* | 3/2005 | Breed .................. B60N 2/0232 340/13.31 |
| 2007/0184420 | A1 | 8/2007 | Mathan et al. |
| 2007/0299862 | A1* | 12/2007 | Aggarwal ............... G06F 16/40 |
| 2013/0007668 | A1* | 1/2013 | Liu ....................... G06F 3/0482 715/841 |
| 2013/0169560 | A1 | 7/2013 | Cederlund et al. |
| 2013/0249947 | A1* | 9/2013 | Reitan ..................... G06F 3/011 345/633 |
| 2014/0063061 | A1* | 3/2014 | Reitan ..................... G09G 3/003 345/633 |
| 2014/0098130 | A1* | 4/2014 | Fein ....................... G06T 19/006 345/633 |
| 2014/0237366 | A1 | 8/2014 | Poulos et al. |
| 2015/0334457 | A1 | 11/2015 | Chandel et al. |
| 2016/0004788 | A1* | 1/2016 | Elgort ................ G06F 16/9038 707/722 |
| 2016/0021412 | A1* | 1/2016 | Zito, Jr. ............... H04N 21/488 725/13 |
| 2016/0027046 | A1 | 1/2016 | Huang et al. |
| 2016/0224871 | A1* | 8/2016 | Koren .................. G06K 9/6284 |
| 2016/0378836 | A1 | 12/2016 | Purwar |
| 2016/0378861 | A1* | 12/2016 | Eledath .............. G06K 9/00718 707/766 |
| 2018/0061220 | A1* | 3/2018 | Greene .............. G06K 9/00771 |
| 2018/0089502 | A1* | 3/2018 | Bostick ................. G06T 11/001 |
| 2020/0077136 | A1* | 3/2020 | Kwatra ............... H04L 65/4084 |
| 2020/0134315 | A1* | 4/2020 | Trim ...................... G06K 9/033 |

OTHER PUBLICATIONS

Enabling user-centered interactions in the Internet of Things, Leppanen et al., IEEE (Year: 2016).*

Mobile Augmented Reality Survey: From Where We Are to Where We Go, IEEE, Chatzopoulos et al., (Year: 2017).*

Enabling user-centered interactions in the Internet of Things, IEEE, Leppanen et al., (Year: 2016).*

Human-computer cloud for decision support in tourism_Approach and architecture, IEEE, Smirnov et al., (Year: 2016).*

Geitgey, "Machine Learning is Fun! Part 4: Modem Face Recognition with Deep Learning", https://medium.com/@ageitgey/machine-learning-is-fun-part-4-modern-face-recognition-with-deep-learning-c3cffc121d78, Jul. 24, 2016, 23 pages.

Kim et al., "Augmenting human senses to improve the user experience in cars: applying augmented reality and haptics approaches to reduce cognitive distances", Multimedia Tools and Applications, Aug. 2016, pp. 9587-9607, vol. 75, Issue 16, Springer US, https://doi.org/10.1007/s11042-015-2712-4.

Mell et al., "The NIST Definition of Cloud Computing," National Institute of Standards and Technology, Sep. 2011, p. 1-3, Special Publication 800-145.

11Giraffes, "Context Aware Marketing", 11 Giraffes, Digital Signage Federation, http://www.11giraffes.com/context-aware-marketing/, accessed Oct. 10, 2018, 2 pages.

* cited by examiner

HUMAN RELATIONSHIP-AWARE AUGMENTED DISPLAY

BACKGROUND

The present invention relates, generally, to the field of computing, and more particularly to display systems.

Display systems are used for broadcasting information in various places, such as airports, railway stations, exhibitions and conference centers. Display systems are useful for showing information relating to advertisements and other key information in various sites. For example, display systems in an elevator may relate to displaying high-resolution commercial advertisements on digital screens placed inside elevators in high traffic buildings usually paid for by advertisement sponsors. Most of the current display systems are pre-programmed to perform some set of operations based on time and location. Most of the time, a viewer or intended user does not pay much attention to the displayed messages or information. The content displayed in such systems may be static in nature as the same information or content are displayed to a plurality of viewers at a time irrespective of their preferences or interests.

SUMMARY

According to one embodiment, a method, computer system, and computer program product for human relationship-aware augmented display are provided. The embodiment may include identifying one or more potential viewers utilizing real-time sensor data. The embodiment may also include extracting relationship information related to relationships among each identified viewer and one or more companions based on a plurality of data from a plurality of databases. The embodiment may further include creating a relationship graph based on the extracted relationship information. The embodiment may also include determining a relationship model based on the created relationship graph. The embodiment may further include mapping the determined relationship model to content. The embodiment may also include augmenting display systems with the content. The embodiment may further include displaying the augmented content on one or more display systems.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to human relationship-aware augmented display systems. The following described exemplary embodiments provide a system, method, and program product to, among other things, allow a user to collect and extract human relationships, characteristics of people, determine targeted context for targeted viewers based on a relationship model and display the targeted content in various settings. Therefore, the present embodiment has the capacity to improve the technical field of display systems by generating targeted display content for a viewer and increasing the effectiveness of information transmittal.

As previously described, display systems may relate to broadcasting information in various places, such as airports, railway stations, exhibitions and conference centers. Display systems are useful for showing information relating to advertisements and other key information in various sites. For example, display systems in an elevator or a commercial building may relate to displaying high-resolution commercial advertisements on digital screens placed inside elevators in high traffic buildings usually paid for by advertisement sponsors. Most of the current display systems are pre-programmed to perform some set of operations based on time and location. Most of the time, a viewer or intended user does not pay much attention to the displayed messages or information. The content displayed in such systems may be static in nature as the same information or content are displayed to a plurality of viewers at a time irrespective of their preferences or interests.

Although display systems are utilized to show information relating to advertisements and other important information, such systems typically have been a static, mis-targeted or general tool that runs in a loop rather than a specifically pre-programmed manner. Such information is not specific or interesting enough to general viewers as they are not the time nor context-sensitive, and it could possibly lead to substantial revenue loss to advertisers or creators of such information. As such, it may be advantageous to, among other things, implement a system capable of collecting and extracting human relationship models based on social media data and personal information and generate targeted content based on the collected information and transmit to the nearest display system, which may increase the efficacy of information delivery. It may be also advantageous to implement a system capable of extracting instantaneous human relationships based on sensors and natural language processing.

According to one embodiment, a human relationship-aware augmented display program may collect social media data and personal information and extract human relationships among viewers to generate a human relationship model and map the model to certain content to create and display targeted display content. In at least one embodiment, a human relationship-aware augmented display program may create relationship models and update a plurality of model databases and save the generated display content in a repository. In at least one other embodiment, a human relationship-aware augmented display program may guide a viewer to the nearest, most suitable or relevant display screen if there are multiple display screens are available, utilizing an algorithm which computes the most ideal angle or distance between a display screen and the viewer.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to extract human relationships, determine targeted context for targeted viewers based on a relationship model and display the targeted content.

Figure 1:
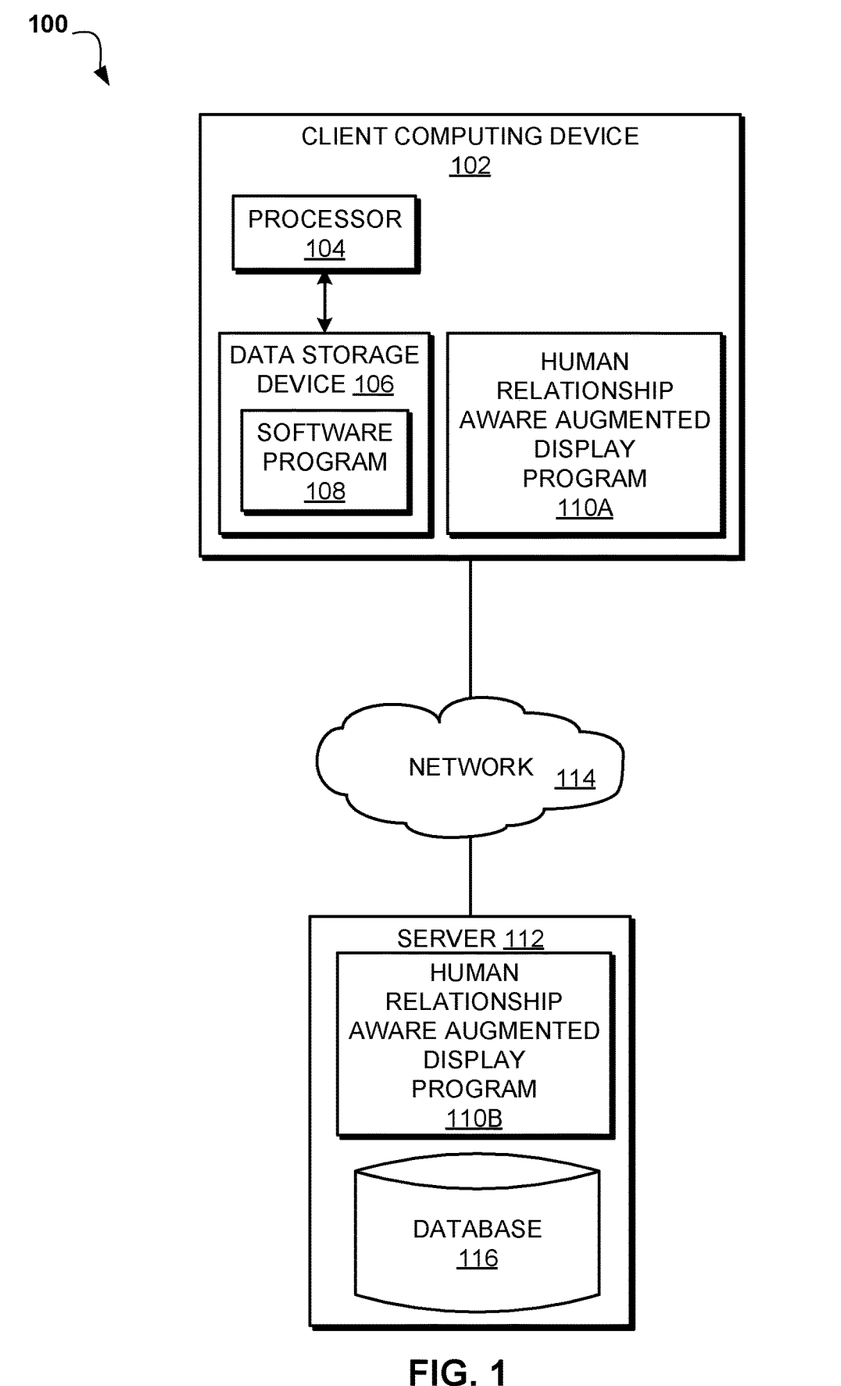
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a human relationship-aware augmented display program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a human relationship-aware augmented display program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the human relationship-aware augmented display program 110A, 110B may be a program capable of identifying a plurality of potential viewers in various places utilizing audio, video, speech or face recognition systems and extracting human relationship data from social media sites or real-time communications utilizing natural language processing technologies. The human relationship-aware augmented display program 110A, 110B may also generate or update relationship models and map those models to certain content so that the content can be displayed on digital screens or augmented with audio or video information already being played or running. The human relationship-aware augmented display process is explained in further detail below with respect to FIG. 2.

Figure 2:
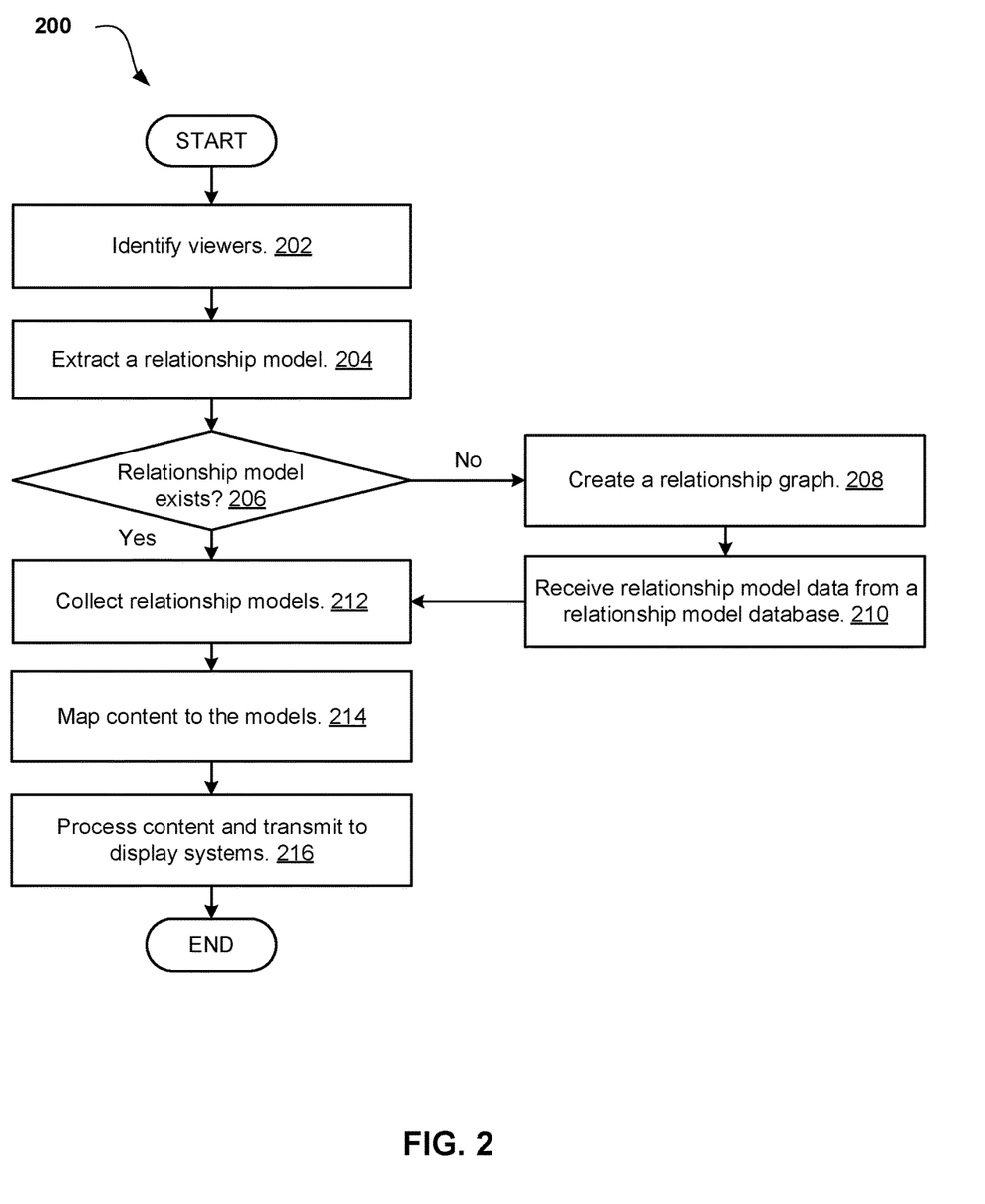
FIG. 2 is an operational flowchart illustrating a human relationship-aware augmented display process according to at least one embodiment.

FIG. 2 is an operational flowchart illustrating a human relationship-aware augmented display process 200 according to at least one embodiment. At 202, the human relationship-aware augmented display program 110A, 110B identifies viewers. According to one embodiment, the human relationship-aware augmented display program 110A, 110B may identify viewers utilizing image recognition systems placed nearby. For example, the human relationship-aware augmented display program 110A, 110B may receive image data from a camera system placed in buildings or shopping mall lobbies and utilize image analysis to identify viewers. In at least one other embodiment, the human relationship-aware augmented display program 110A, 110B may collect and stream real-time sensor data including viewers' origins, destinations, and appearances from image recognition systems.

At 204, the human relationship-aware augmented display program 110A, 110B extracts relationship models. According to one embodiment, the human relationship-aware augmented display program 110A, 110B may extract a plurality of relationship data associated with one or more viewers from various sources. For example, the human relationship-aware augmented display program 110A, 110B may collect data from social media sites and determine a potential viewer's relationship status, such as "father-son", "mother-daughter", "teacher-student", "employer-employee", etc. The human relationship-aware augmented display program 110A, 110B may also extract relationship status based on viewers' real-time communication utilizing natural language processing. For example, the human relationship-aware augmented display program 110A, 110B may stream real-time communication between an adult and a toddler in an elevator talking about an animation movie and determine that the adult is the mother of the toddler. The human relationship-aware augmented display program 110A, 110B may further extract human relationship information utilizing audio and video systems or face recognition technologies. For example, if a middle-aged man and a toddler walk into a shopping mall, a face recognition system may recognize them as a father and a son or a grandfather and a grandchild.

At 206, the human relationship-aware augmented display program 110A, 110B determines whether a relationship model exists. According to one embodiment, the human relationship-aware augmented display program 110A, 110B may determine that a relationship model pertaining to a viewer already exists, if a relationship model was extracted in step 204. If the human relationship-aware augmented display program 110A, 110B determines that a relationship model exists (step 206, "Yes" branch), then the human relationship-aware augmented display program 110A, 110B may continue to step 212 to collect the relationship model. If the human relationship-aware augmented display program 110A, 110B determines that a relationship model pertaining to a viewer does not exist (step 206, "No" branch), then the human relationship-aware augmented display program 110A, 110B may continue to step 208 to create a relationship graph and update a model database.

At 208, the human relationship-aware augmented program 110A, 110B creates a relationship graph. According to one embodiment, the human relationship-aware augmented display program 110A, 110B may create a relationship graph based on two-tiers of content or information filtering: (1) first-order content or information filtering based on high level information as to human relationship, such as appearances, geographical information, ethnicity; (2) second-order content or information filtering based on different level of information that may be collected from social media sites, identifying a status, such as a parent, a child, a teacher, a student, a customer, a service provider, etc. The human relationship-aware augmented program 110A, 110B may further generate a distribution graph based on the first-order and the second-order relationship information obtained above. The generated graph may depict one or more potential viewers' basic identification or names and how they are related to each other in terms of basic relationship status, such as a parent-child relationship, a teacher-student relationship, etc. The human relationship-aware augmented display program 110A, 110B may expand the generated relationship graph by integrating it with multiple relationship data associated with one or more additional potential viewers. According to one other embodiment, the human relationship-aware augmented display program 110A, 110B may update a plurality of databases simultaneously or almost simultaneously with a newly generated model or relationship graph.

At 210, the human relationship-aware augmented display program 110A, 110B receives relationship model data from a relationship model database. According to one embodiment, the human relationship-aware augmented display program 110A, 110B may transmit a plurality of newly generated or recently updated relationship models to a plurality of databases simultaneously or almost simultaneously. The human relationship-aware augmented display program 110A, 110B may also retrieve and collect relationship models from the same databases once each database is updated using the created relationship graph.

At 212, the human relationship-aware augmented display program 110A, 110B collects relationship models. According to one embodiment, the human relationship-aware augmented display program 110A, 110B may collect relationship models extracted in step 204 or newly generated models saved in a relationship model database in step 210. In at least one other embodiment, the human relationship-aware augmented display program 110A, 110B may collect relationship models from the relationship information which a user may elect to manually enter and save in a database. For example, a user may manually enter the user's basic identity and relationship information, such as a parent, child, age, appearance, etc. If a user manually identifies the user as a father, then the human relationship-aware augmented display program 110A, 110B may add such information to the collected relationship models or the models already existing in a database.

At 214, the human relationship-aware augmented display program 110A, 110B map content to the models. According to one embodiment, the human relationship-aware augmented display program 110A, 110B may determine and assign particular content to each collected relationship model. The human relationship-aware augmented display program 110A, 110B may collect content data from social media sites or a plurality of content databases and determine which content are appropriate for particular relationship models. For example, the human relationship-aware augmented display program 110A, 110B may search for popular content related to particular relationships, such as a father-son relationship or brother-sister relationship, etc. The human relationship-aware augmented display program 110A, 110B may determine and recommend certain information related to baseball games are popular for fathers and sons.

At 216, the human relationship-aware augmented display program 110A, 110B processes content and transmits the content to display systems. According to one embodiment, the human relationship-aware augmented display program 110A, 110B may process the recommended content and augment the recommended content with a currently running display. For example, when a husband and a wife are watching an advertisement displayed in a shopping mall and their child comes in between, the human relationship-aware augmented display program 110A, 110B may change the display content from romantic travel or vacation information to a waterpark or amusement park promotions. According to at least one other embodiment, the human relationship-aware augmented display program 110A, 110B may augment the recommended content with other systems, such as home automation system or television systems. For example, the human relationship-aware augmented system may alter the subtitle language or advertisement, or movies played on television when a child is present. With respect to a home automation system, the human relationship-aware augmented display program 110A, 110B may tune audio, video and light settings to a romantic mode when a husband and a wife are sitting in a sofa together at night. According to one other embodiment, the human relationship-aware augmented display program 110A, 110B may learn a new setting for a relationship model based on how often and how long one or more viewers remain in the processed setting.

Figure 3:
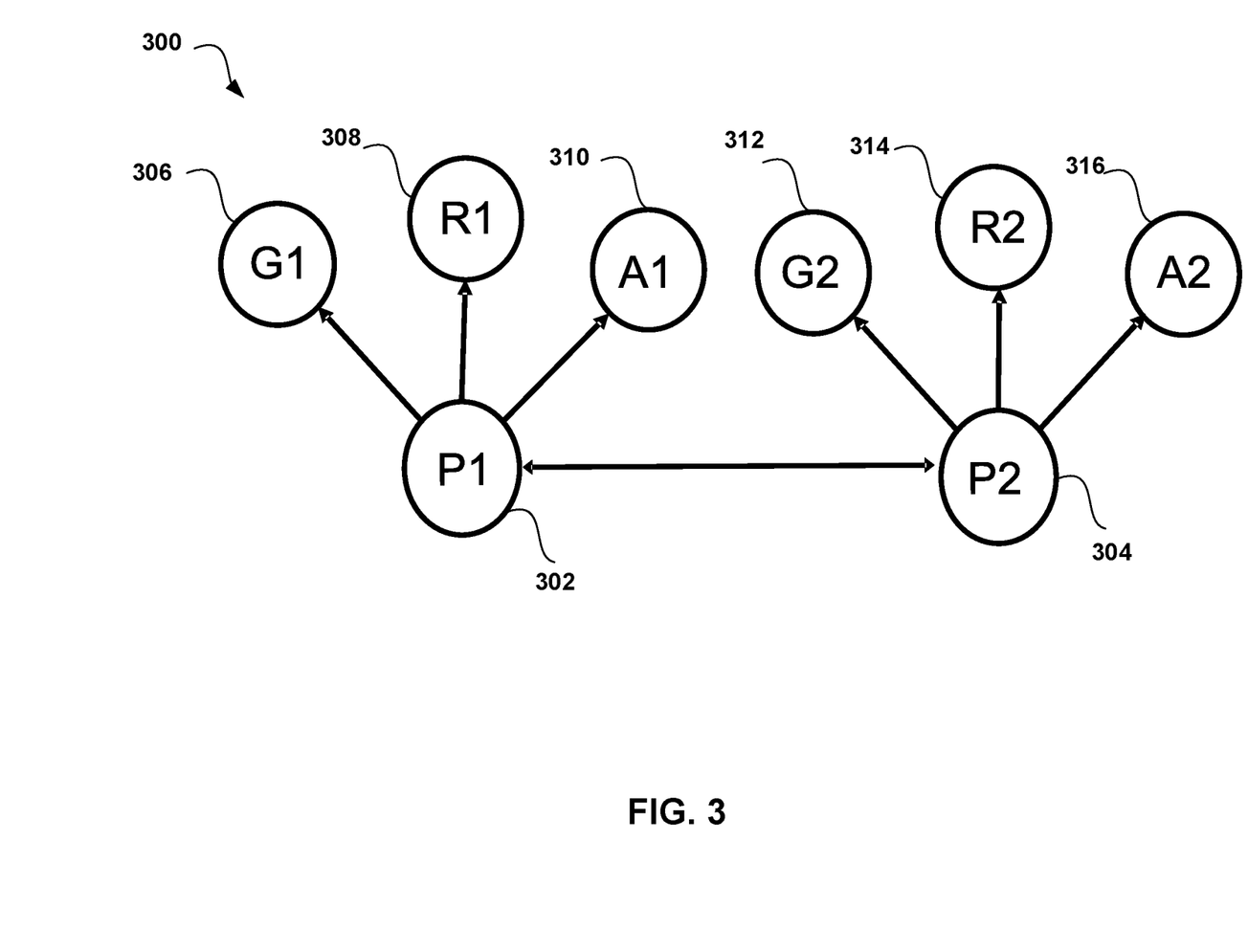
FIG. 3 is a functional block diagram of a basic relationship graph creation platform according to at least one embodiment.

Referring now to FIG. 3, a functional block diagram of a relationship graph creation platform 300 is depicted according to at least one embodiment. According to one embodiment, the human relationship-aware augmented display program 110A, 110B may generate a distributed graph based on the first-order and the second-order relationship information. The first order information may include high-level information regarding human relationships, such as appearances, geographical information, ethnicity, etc. The second order information may pertain to the more detailed description or labeling of human relationships, such as parent, child, teacher, student, customer, service provider, etc. The human relationship-aware augmented display program 110A, 110B may create a graph depicting two persons, P1 302 and P2 304 with three relationship information categories: gender information G1 306, G2 312; regional information R1 308, R2 314; and age information A1 310, A2 316.

Figure 4:
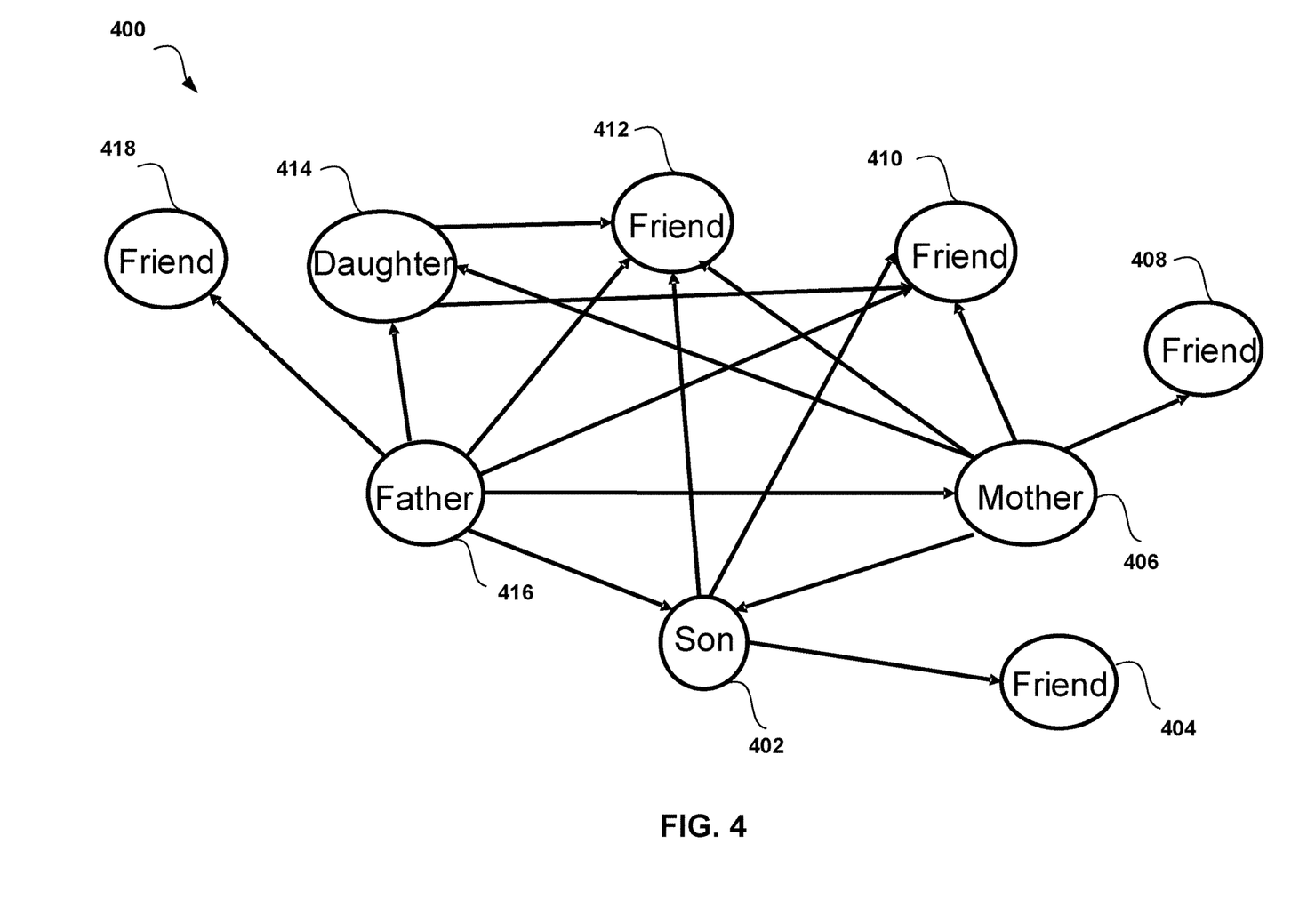
FIG. 4 is a functional block diagram of a detailed relationship graph creation platform according to at least one embodiment.

Referring now to FIG. 4, a functional block diagram of a relationship graph creation platform 400 is depicted according to at least one embodiment. According to one embodiment, the human relationship-aware augmented display program 110A, 110B may generate a relationship graph based on more complex data that includes multiple items of relationship information. For example, Son 402 may have relationships with Friend 404, Friend 412, Father 416, Mother 406 and Friend 410. Friend 412 is also a friend of Daughter 414, Father 416 and Mother 406. Father 416's friend may be Friend 418. Friend 412 is a mutual friend of Son 402 and Mother 406. Friend 408 is a friend of Mother 406. In at least one other embodiment, the human relationship-aware augmented display program 110A, 110B may identify these individuals and save their relationships in a database for future references.

Figure 5:
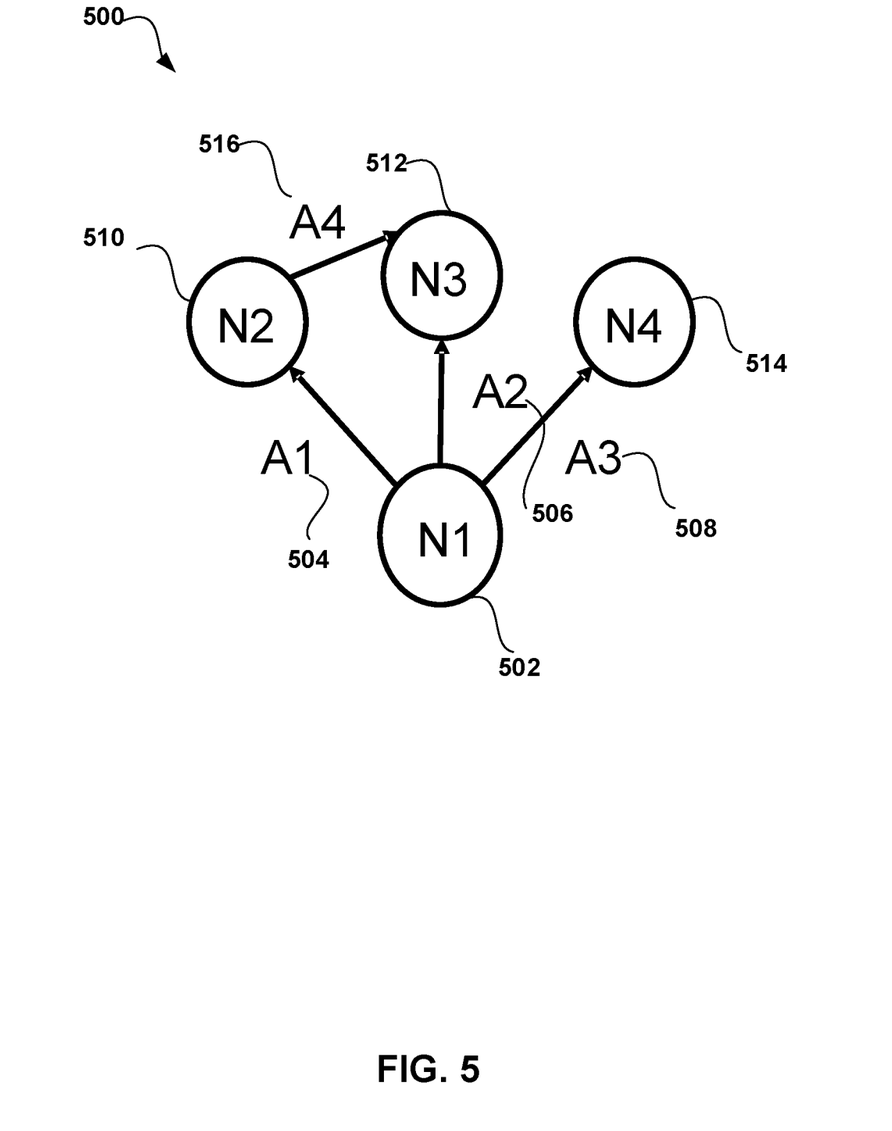
FIG. 5 is a functional block diagram of a relationship graph creation and content mapping platform according to at least one embodiment.

Referring now to FIG. 5, a functional block diagram of a relationship graph creation platform 500 is depicted according to at least one embodiment. According to one embodiment, the human relationship-aware augmented display program 110A, 110B may generate a graph containing nodes that represent individuals and arcs that represent relationships of those individuals. Each arc may have different characteristics based on a relationship. The human relationship-aware augmented display program 110A, 110B may process the augmented content based on properties of arcs. For example, four individuals, N1 502, N2 510, N3 512 and N4 514 may be connected to one another through four arcs, A1 504, A2 506, A3 508 and A4 516. Each arc may be encoded with a relationship model. For example, a husband-wife relationship may be represented by the arc A1 504. A father-son relationship may be represented by the arc A2 506. A mother-son relationship may be represented by the arc A4 516 and a brother-brother relationship may be represented by the arc A3 508. According to at least one other embodiment, the human relationship-aware augmented display program 110A, 110B may map each arc to certain content. For example, the human relationship-aware augmented display program 110A, 110B may determine that content related to romance is appropriate for a husband-wife relationship, and map the content related to romance to A1 504. The human relationship-aware augmented display program 110A, 110B may also determine that content related to education are appropriate for the arc A2 506 and map the content related to education to A2 506.

It may be appreciated that FIGS. 2-5 provide only an illustration of one implementation and do not imply any limitations with regard to how different embodiments may be implemented. Many modifications to the depicted environments may be made based on design and implementation requirements. For example, in at least one embodiment, the human relationship-aware augmented display program 110A, 110B may self-improve and adjust display time and content on one or more display screens after the human relationship-aware augmented display program 110A, 110B analyzes the effectiveness of the display.

Figure 6:
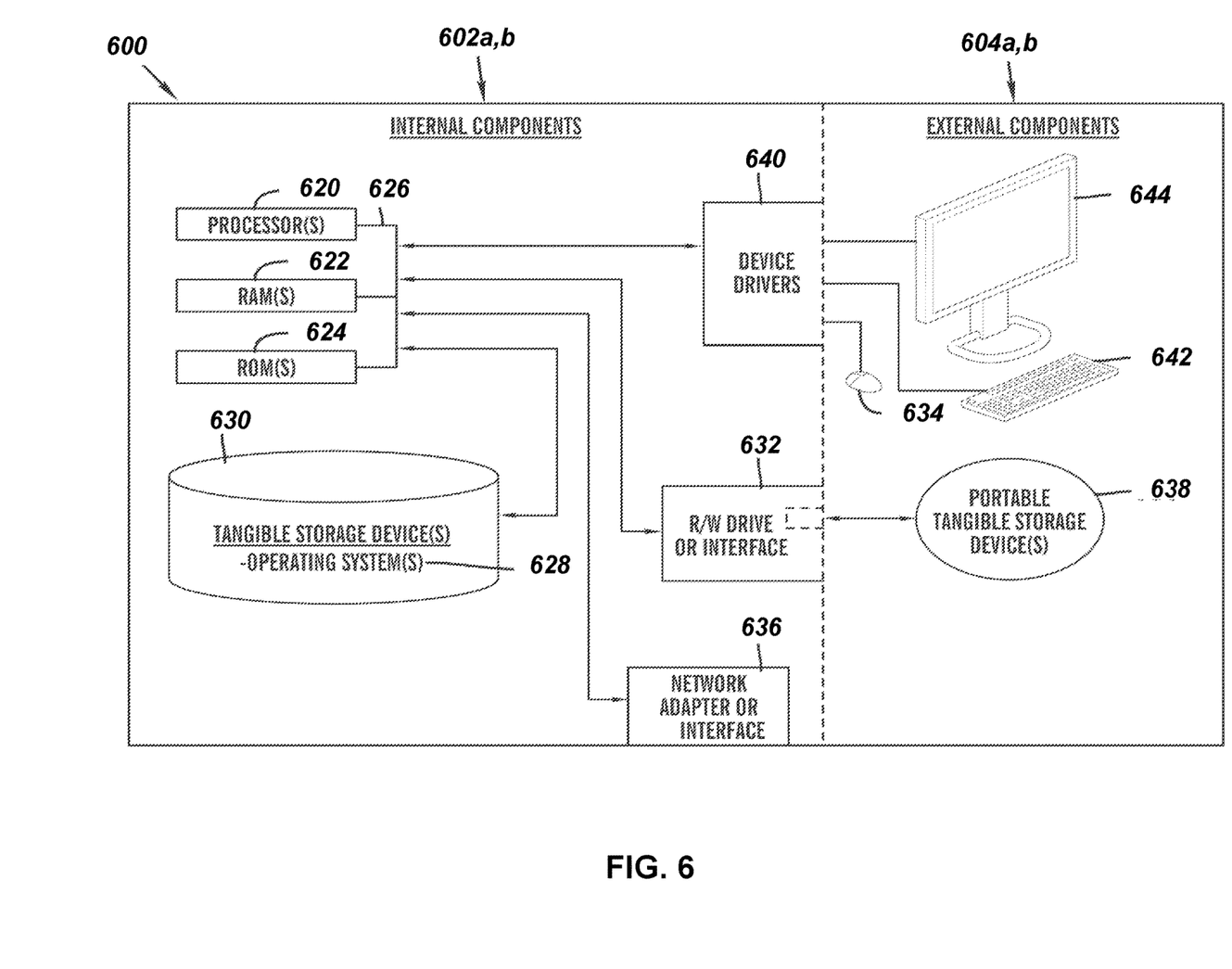
FIG. 6 is a block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 602 *a,b* and external components 604 *a,b* illustrated in FIG. 4. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the software program 108 and the human relationship-aware augmented display program 110A in the client computing device 102 and the human relationship-aware augmented display program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 *a,b* also includes an R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the human relationship-aware augmented display program 110A, 110B, can be stored on one or more of the respective portable computer-readable tangible storage devices 638, read via the respective R/W drive or interface 632 and loaded into the respective hard drive 630.

Each set of internal components 602 *a,b* also includes network adapters or interfaces 636 such as a TCP/IP adapter cards, wireless Wi-Fi interface cards, or 3G or 4G wireless interface cards or other wired or wireless communication links. The software program 108 and the human relationship-aware augmented display program 110A in the client computing device 102 and the human relationship-aware augmented display program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the software program 108 and the human relationship-aware augmented display program 110A in the client computing device 102 and the human relationship-aware augmented display program 110B in the server 112 are loaded into the respective hard drive 630. The network may comprise copper wires, optical fibers, wireless transmission, routers, firewalls, switches, gateway computers and/or edge servers.

Each of the sets of external components 604 *a,b* can include a computer display monitor 644, a keyboard 642, and a computer mouse 634. External components 604 *a,b* can also include touch screens, virtual keyboards, touch pads, pointing devices, and other human interface devices. Each of the sets of internal components 602 *a,b* also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 7:
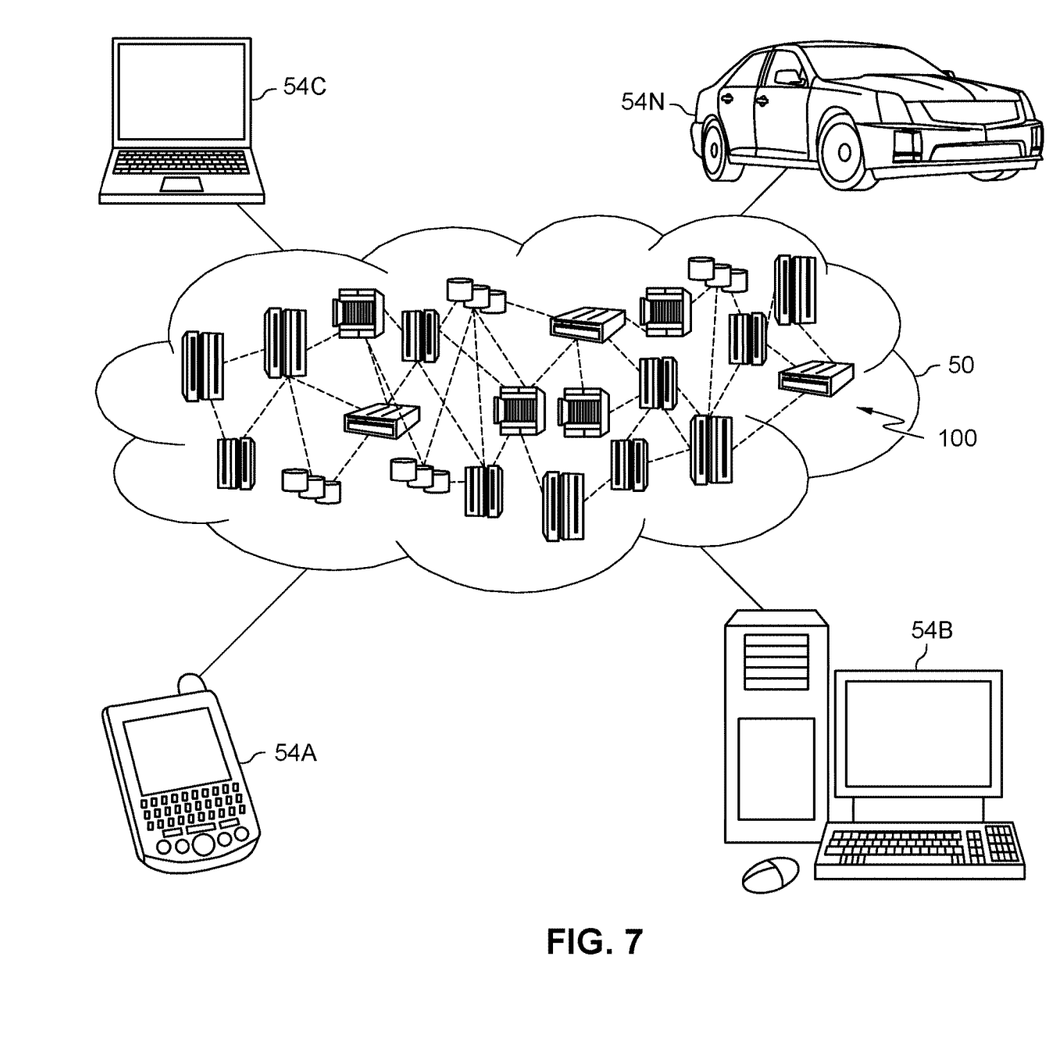
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 8:
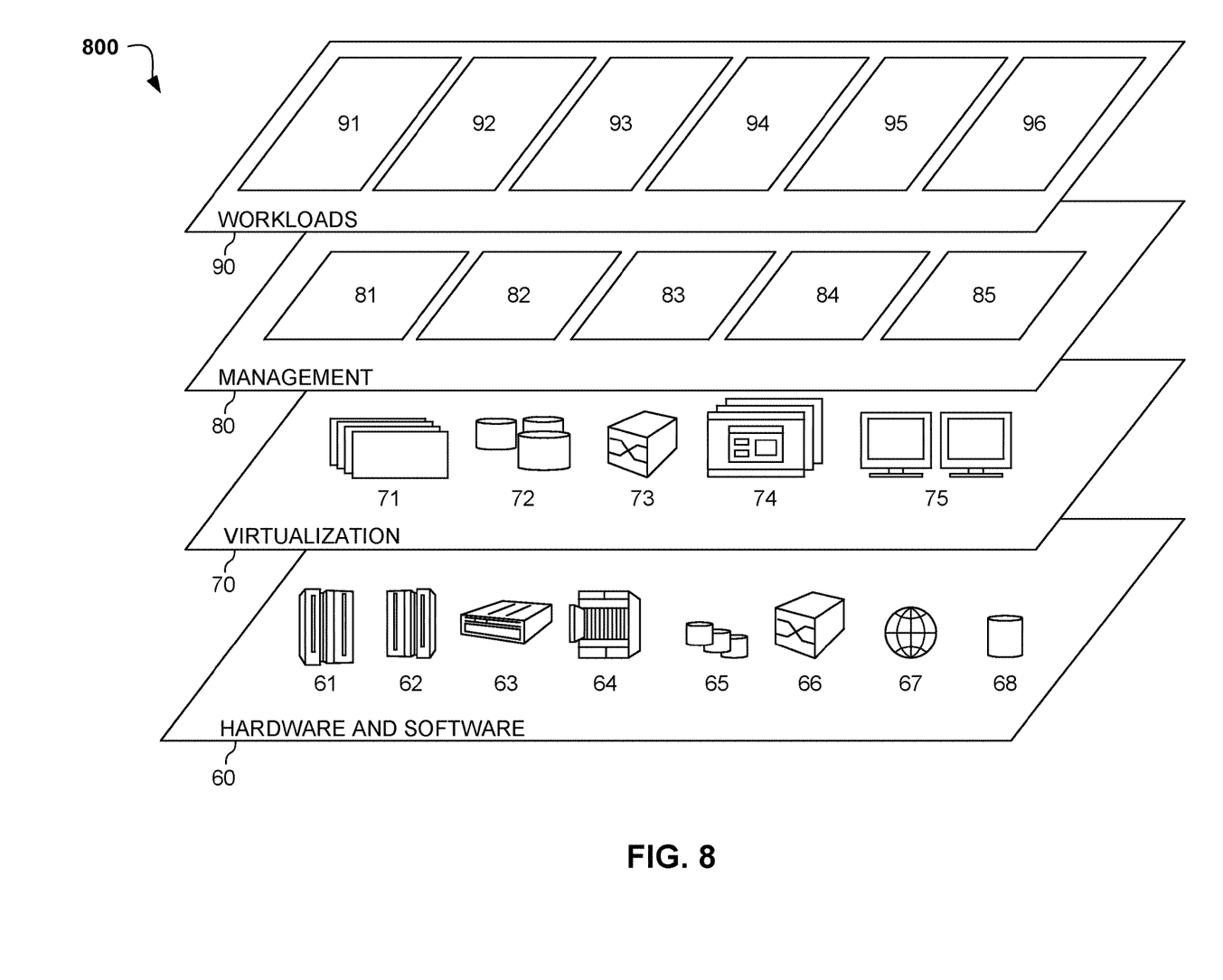
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and human relationship-aware augmented display 96. Human relationship-aware augmented display 96 may relate to generating a database of feedback on display effectiveness or determining which content needs to be displayed first, monitoring various databases, social media site servers, email servers or a user device such as a smartphone or smartwatch for updated information related to viewers' relationships.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for human relationship-aware augmented display, the method comprising:
   identifying, by a processor, multiple potential viewers utilizing real-time sensor data;
   extracting human relationship information related to relationships among each identified viewer and multiple companions based on a plurality of data from a plurality of databases, wherein the human relationship information is related to relationships among each identified viewer and the multiple companions is extracted from social media sites and validated against real-time conversations recorded and analyzed by a voice recognition system;
   creating a relationship graph based on the extracted relationship information;
   determining a relationship model based on the created relationship graph;
   mapping the determined relationship model to content, wherein information related to the content is collected from social media sites or a plurality of content databases, wherein popular content related to the determined relationship model is determined based on the information related to the content and recommended to a user;
   augmenting display systems with the content; and
   displaying the augmented content on one or more display systems.

2. The method of claim 1, wherein the real-time sensor data is received from a camera or an image recognition system.

3. The method of claim 1, wherein the plurality of data related to the relationships between each identified viewer and the one or more companions is manually provided by a user.

4. The method of claim 1, further comprising:
   determining one or more display screens most suitable for a viewer's viewership utilizing an algorithm which computes a most ideal angle or a most ideal distance between a display screen and a viewer based on an image recognition system.

5. The method of claim 1, further comprising:
   augmenting home automation systems with the determined display content; and
   adjusting temperature, light, audio and video systems based on analysis of the relationship model and the mapped content.

6. The method of claim 1, wherein the relationship information related to relationships among each identified viewer and the one or more companions is extracted from real-time conversations recorded and analyzed by a voice recognition system.

7. The method of claim 1, further comprising:
   updating a plurality of databases containing the relationship information and the mapped content based on how often and how long a viewer remains in a display setting.

8. A computer system for human relationship-aware augmented display, the computer system comprising:
   identifying, by a processor, multiple potential viewers utilizing real-time sensor data;
   extracting human relationship information related to relationships among each identified viewer and multiple companions based on a plurality of data from a plurality of databases, wherein the human relationship information is related to relationships among each identified viewer and the multiple companions is extracted from social media sites and validated against real-time conversations recorded and analyzed by a voice recognition system;
   creating a relationship graph based on the extracted relationship information;
   determining a relationship model based on the created relationship graph;
   mapping the determined relationship model to content, wherein information related to the content is collected from social media sites or a plurality of content databases, wherein popular content related to the determined relationship model is determined based on the information related to the content and recommended to a user;

augmenting display systems with the content; and displaying the augmented content on one or more display systems.

9. The computer system of claim 8, wherein the real-time sensor data is received from a camera or an image recognition system.

10. The computer system of claim 8, wherein the plurality of data related to the relationships between each identified viewer and the one or more companions is manually provided by a user.

11. The computer system of claim 8, further comprising:
determining one or more display screens most suitable for a viewer's viewership utilizing an algorithm which computes a most ideal angle or a most ideal distance between a display screen and a viewer based on an image recognition system.

12. The computer system of claim 8, further comprising:
augmenting home automation systems with the determined display content; and
adjusting temperature, light, audio and video systems based on analysis of the relationship model and the mapped content.

13. The computer system of claim 8, wherein the relationship information related to relationships among each identified viewer and the one or more companions is extracted from real-time conversations recorded and analyzed by a voice recognition system.

14. The computer system of claim 8, further comprising:
updating a plurality of databases containing the relationship information and the mapped content based on how often and how long a viewer remains in a display setting.

15. A computer program product for human relationship-aware augmented display, the computer program product comprising:
identifying, by a processor, multiple potential viewers utilizing real-time sensor data;
extracting human relationship information related to relationships among each identified viewer and multiple companions based on a plurality of data from a plurality of databases, wherein the human relationship information is related to relationships among each identified viewer and the multiple companions is extracted from social media sites and validated against real-time conversations recorded and analyzed by a voice recognition system;
creating a relationship graph based on the extracted relationship information;
determining a relationship model based on the created relationship graph;
mapping the determined relationship model to content, wherein information related to the content is collected from social media sites or a plurality of content databases, wherein popular content related to the determined relationship model is determined based on the information related to the content and recommended to a user;
augmenting display systems with the content; and
displaying the augmented content on one or more display systems.

16. The computer program product of claim 15, wherein the real-time sensor data is received from a camera or an image recognition system.

17. The computer program product of claim 15, wherein the plurality of data related to the relationships between each identified viewer and the one or more companions is manually provided by a user.

18. The computer program product of claim 15, further comprising:
determining one or more display screens most suitable for a viewer's viewership utilizing an algorithm which computes a most ideal angle or a most ideal distance between a display screen and a viewer based on an image recognition system.

19. The computer program product of claim 15, further comprising:
augmenting home automation systems with the determined display content; and
adjusting temperature, light, audio and video systems based on analysis of the relationship model and the mapped content.

20. The computer program product of claim 15, wherein the relationship information related to relationships among each identified viewer and the one or more companions is extracted from real-time conversations recorded and analyzed by a voice recognition system.

* * * * *